United States Patent [19]
Horton

[11] Patent Number: 5,921,379
[45] Date of Patent: Jul. 13, 1999

[54] MODULAR CONVEYOR BELT SUITABLE FOR FOLLOWING STRAIGHT OR CURVED PATHS

[75] Inventor: Paul L. Horton, Metairie, La.

[73] Assignee: The Laitram Corporation, Haraham, La.

[21] Appl. No.: 08/786,805

[22] Filed: Jan. 21, 1997

Related U.S. Application Data

[60] Provisional application No. 60/010,480, Jan. 23, 1996.

[51] Int. Cl.[6] .................................................. B65G 17/06
[52] U.S. Cl. ........................... 198/852; 198/778; 198/831
[58] Field of Search .................................... 198/852, 778, 198/831

[56] References Cited

U.S. PATENT DOCUMENTS

| | | | |
|---|---|---|---|
| 4,078,655 | 3/1978 | Roinestad | 198/848 |
| 4,742,907 | 5/1988 | Palmaer | 198/831 |
| 4,754,872 | 7/1988 | Damkjaer | 198/852 |
| 4,934,517 | 6/1990 | Lapeyre | 198/852 |
| 5,076,422 | 12/1991 | Clopton | 198/838 |
| 5,174,439 | 12/1992 | Spangler et al. | 198/853 |
| 5,181,601 | 1/1993 | Palmaer et al. | 198/831 |
| 5,318,169 | 6/1994 | Faulkner et al. | 198/778 |
| 5,346,059 | 9/1994 | Irwin | 198/852 |
| 5,372,248 | 12/1994 | Horton | 198/852 |
| 5,431,275 | 7/1995 | Faulkner | 198/853 |

*Primary Examiner*—Johnny D. Cherry
*Assistant Examiner*—Steven B. McAllister
*Attorney, Agent, or Firm*—James T. Cronvich

[57] ABSTRACT

A modular conveyor belt constructed of a series of rows of plastic belt modules hingedly interlinked by hinge pins and suitable for following straight or curved paths. Aligned slots formed in hinge elements on one end of a row are variably elongated in the direction of belt travel. Bearing surfaces bounding the distal ends of slots on one side of the row are aligned transverse to the direction of travel to engage the hinge pin and share belt pull on a straight run. Bearing surfaces bounding the distal ends of slots on the opposite side of the row are aligned oblique to the transverse direction to engage the hinge pin and share belt pull in a turn.

32 Claims, 4 Drawing Sheets

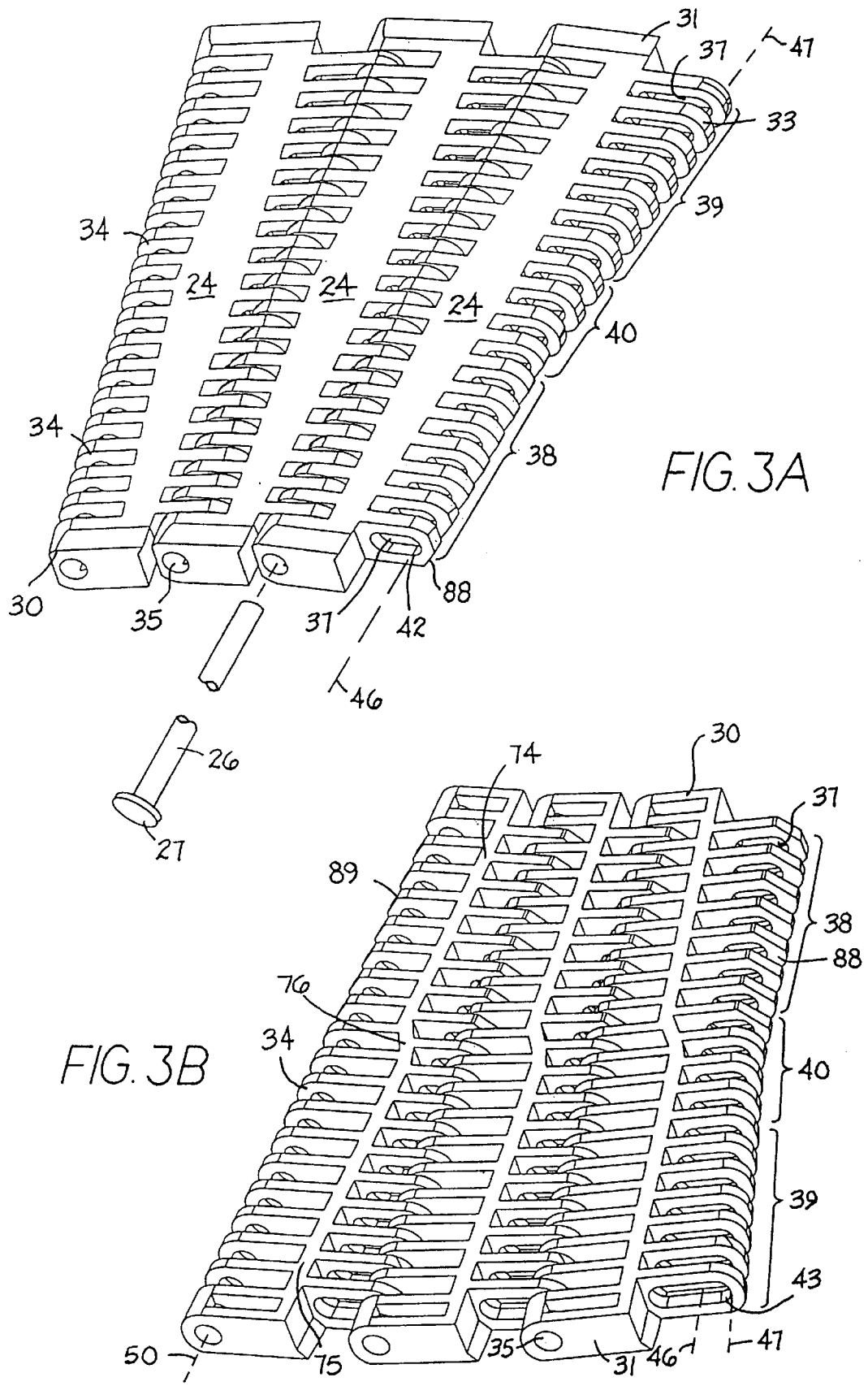

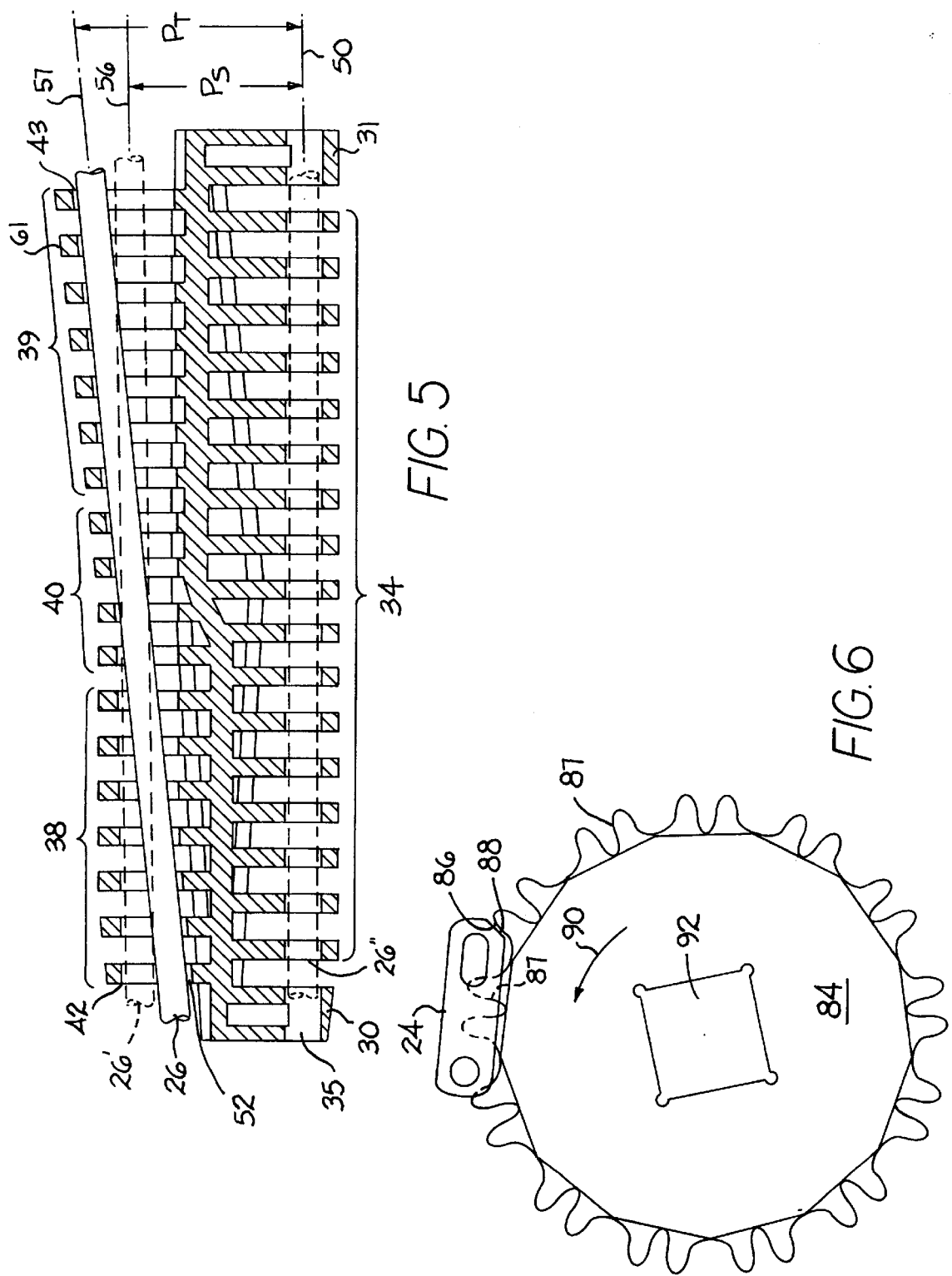

MODULAR CONVEYOR BELT SUITABLE FOR FOLLOWING STRAIGHT OR CURVED PATHS

CROSS-REFERENCE TO RELATED APPLICATIONS

This application claims the benefit of U.S. Provisional Patent Application Ser. No. 60/010,480, filed Jan. 23, 1996.

BACKGROUND

The invention relates to conveyor belts and, more particularly, to modular plastic conveyor belts constructed of rows of plastic belt modules hingedly interlinked by hinge pins.

Because they do not corrode and are easy to clean, plastic conveyor belts are used widely, especially to convey food products. Modular plastic conveyor belts are made up of molded plastic modular links, or belt modules, arranged in rows. Spaced apart link ends extending from each end of the modules include aligned apertures to accommodate a pivot rod. The link ends along one end of a row of modules are interleaved with the link ends of an adjacent row. A pivot rod, or hinge pin, journalled in the aligned apertures of the end-to-end-connected rows, connects adjacent rows together to form an endless conveyor belt capable of articulating about a drive sprocket.

In many industrial applications, conveyor belts are used to carry products along paths including curved, as well as straight, segments. Belts capable of flexing sidewise to follow curved paths are referred to as side-flexing, turn, or radius belts. As a radius belt negotiates a turn, the belt must fan out because the edge of the belt at the outside of the turn follows a longer path than the edge at the inside of the turn. To enable the belt to fan out, the apertures in the link ends on one end of each row are typically elongated in the direction of belt travel. The elongated apertures allow the belt to collapse at the inside of a turn and to spread at the outside.

The requirement of following a curved path causes problems not found in straight-running belts. For example, because the elongated apertures of conventional radius belts are identical in length across the width of the belt, only one or a very few of the link ends at the outside of a turn bear the entire belt pull. On a straight run, the belt pull is distributed across the entire width of the belt. Unless the outer link ends are specially bolstered, the belt pull strength rating is limited by the pull strength in a turn, which is often up to ten times less than on a straight. Thus, radius belts must be heavier and stronger than straight-running belts conveying the same load. Because the overall scale of structures and discontinuities on heavier belts is greater than on lighter belts, heavier belts are more likely to trip products such as beverage containers with small feet.

A conveyor belt having special edge modules with closer link end spacing and tapered pivot rod slots to improve the distribution of the pull at the outside of a turn is disclosed in U.S. Pat. No. 5,174,439, issued Dec. 29, 1992. A belt made up of those edge modules, however, still confines the belt pull in a turn to only a few closely spaced, thin link ends at the outside of the turn. The belt's strength in turns is less than on straight runs. This disparity in strength is greater the wider the belt. Thus, belt strength must be wasted to accommodate turns.

A sought-after feature in radius belts is a low turning ratio, i.e., the ratio of the radius of the tightest conveyor turn path to the width of the belt. Most radius belts have turning ratios of about 2:1 or greater. Thus, turns must be long and gradual, taking up otherwise usable space. Smaller turning ratios are generally limited by interference between the interleaved link ends as they collapse at the inside of a turn. A dual-pitch belt that collapses better at the inside of a turn is disclosed in U.S. Pat. No. 5,346,059, issued Sep. 13, 1994. The belt shown has shorter link ends on the inside half of the belt than on the outside half, which allows the inside edge to collapse tighter. The pivot rod apertures along each half, however, are slotted in transverse alignment with one another, and the load is borne by only the outermost and centermost link ends in a turn. On a straight run, belt pull is shared among many link ends. Consequently, the belt must be made much stronger or its load derated in order to handle the turns.

SUMMARY

Wasted belt strength, large differences in pull strength on straights and turns, product tipping, and other shortcomings are avoided by the invention, which provides an endless modular conveyor belt capable of following straight or curved paths. The belt is constructed of a succession of rows of belt modules having hinge elements projecting from each end and spaced apart along the width of the row. Holes, preferably circular, in the hinge elements at one end of the row form an aligned passage to accommodate a hinge pin. The hinge elements on the other end of the row include two sets—a first set extending from a first side of the row inwardly toward a generally central portion of the row and a second set similarly situated on the other side of the row. Slots in both sets are elongated in the direction of travel. Consecutive rows of belt modules are linked hinge-like by hinge pins extending through the interleaved hinge elements of adjacent rows of modules.

In a preferred version of the belt, the slots in the second set of hinge elements decrease in length with distance from the side of the belt designed to ride on the outside of a turn. With the distal ends of the slots arranged collinearly along an axis oblique to the transverse direction, belt pull is shared by all those hinge projections in a turn. The belt thus enjoys the advantages of variable pitch. To further improve the load sharing of the belt in a turn, the distal end of each slot, which serves as a bearing surface in a turn, is angled obliquely in line with the other slot ends of the set.

During straight runs, belt pull is shared among the first set of hinge elements at the other side of the row. The distal ends of the slots in the first set are arranged transverse to the direction of belt travel to provide a generally constant pitch. Bearing surfaces at the distal ends of the slots are transversely aligned and engage the hinge pin on straight runs. In a preferred version, all the hinge elements are of the same thickness. If the first set has the same number of hinge elements as the second set, the belt's pull rating can be the same for both straight and turns.

An interior set of hinge elements between the first and second sets in another version of the belt allows for a smooth transfer of belt pull from the first set to the second set of hinge elements. The distal ends of the slots in the interior set of hinge elements lie along a smooth curve aligned with the transverse distal slot ends at one end of the curve and with the oblique arrangement at the other end.

Preferably, the distal ends of the first set of hinge elements are offset from the ends of the second set in the direction of travel. A transverse connecting member from which the first set of hinge elements extends is likewise offset from a transverse connecting member from which the second set extends. This arrangement allows the belt to negotiate extremely tight turns with the first set at the inside of the turn.

In a preferred version of the belt, each row is made up of a single molded module. Other features of the module include an oblique connecting member near the center that connects the two offset transverse connecting members, undercut hinge elements providing a drive surface for engaging a sprocket, and a conveying surface atop the module body forming a V-shaped edge along one end conforming to the distal end profile of the second set of hinge elements to provide a largely closed conveying surface on both straight and curved paths to avoid tipping conveyed products.

DRAWINGS

These and other features, aspects, and advantages of the invention are better understood with reference to the following description, claims, and drawings in which:

FIGS. 3A and 3B are perspective views of the conveying side and the underside, respectively, of three rows of the conveyor belt of FIG. 1, including a fragmentary view of a hinge pin in FIG. 3A;

Figure 1:
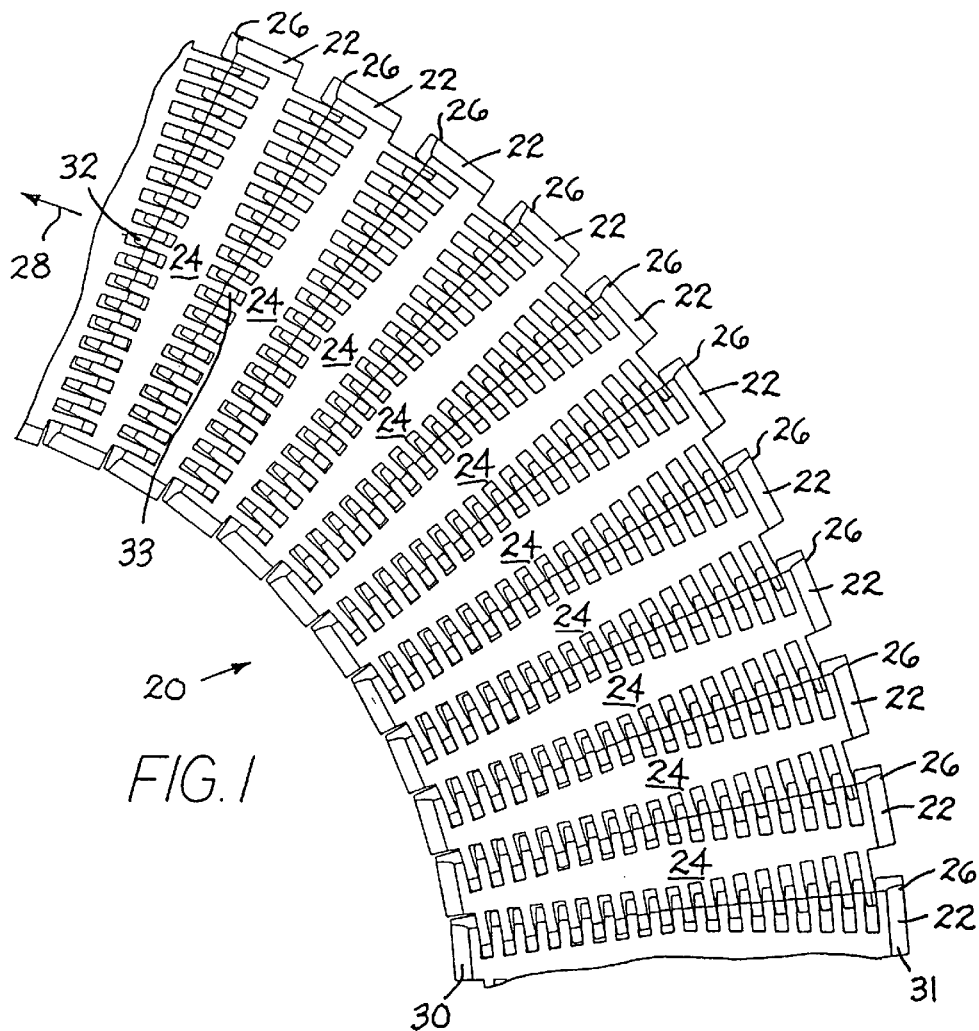
FIG. 1 is a partial plan view of one version of a conveyor belt according to the invention negotiating a curved path.
Figure 4A:
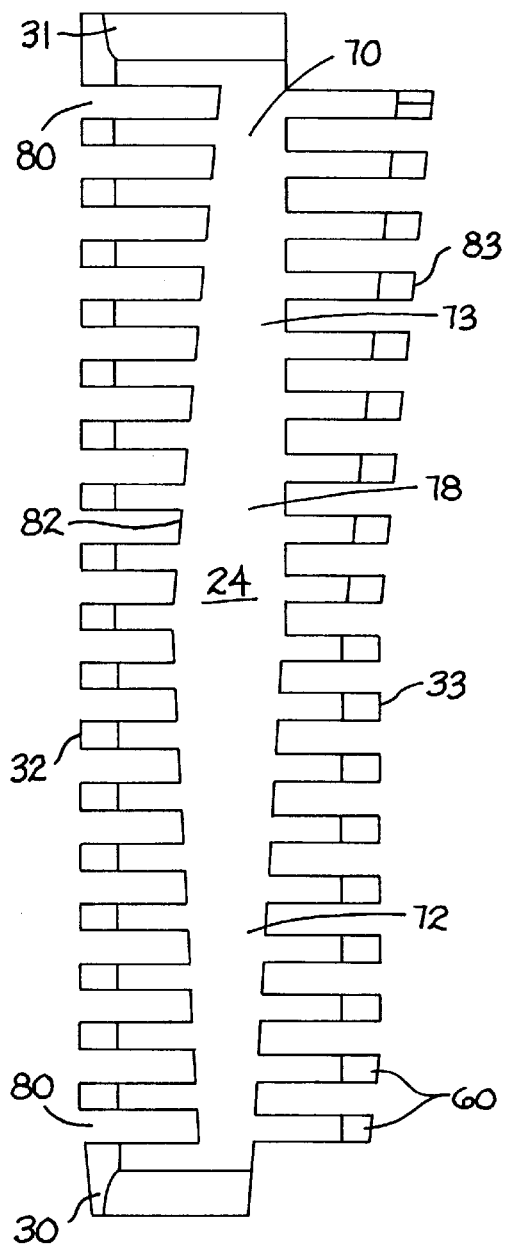
Figure 4B:
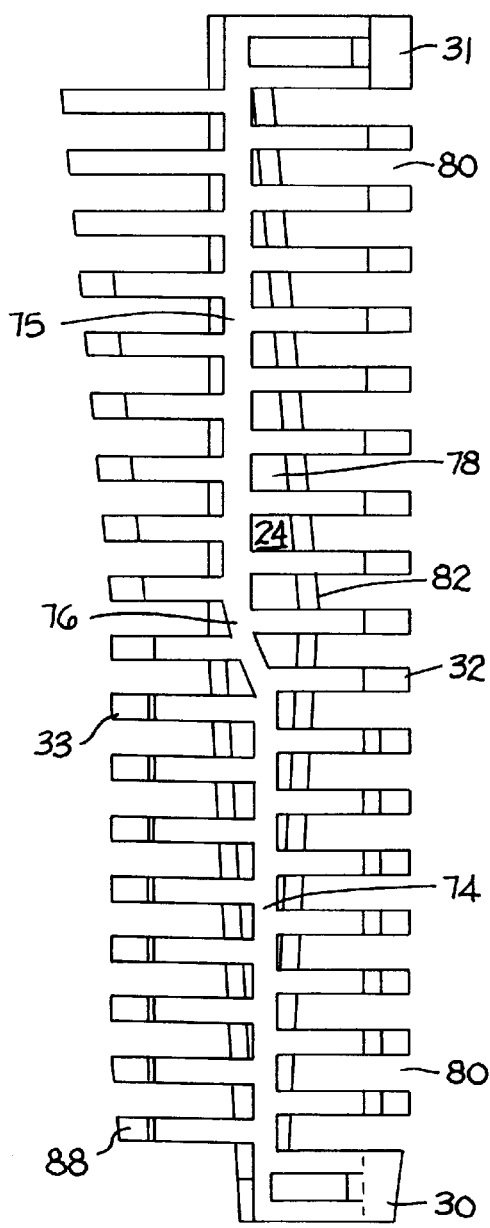
Figure 4C:
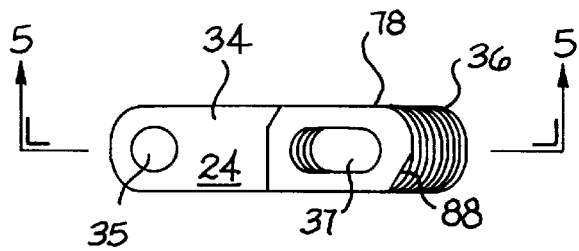

FIGS. 4A, 4B, and 4C are, respectively, top plan, bottom plan, and side elevation views of an individual belt module of the conveyor belt of FIG. 1;

FIG. 5 is a sectional view of the belt module of FIG. 4 taken along the section line of FIG. 4C together with a hinge pin shown in its nested position in a turn and its nested position on a straight run in phantom; and FIG. 6 is a side elevation view showing a version of the driving engagement of a sprocket along a single row of the conveyor belt of FIG. 1.

DESCRIPTION

Figure 2:
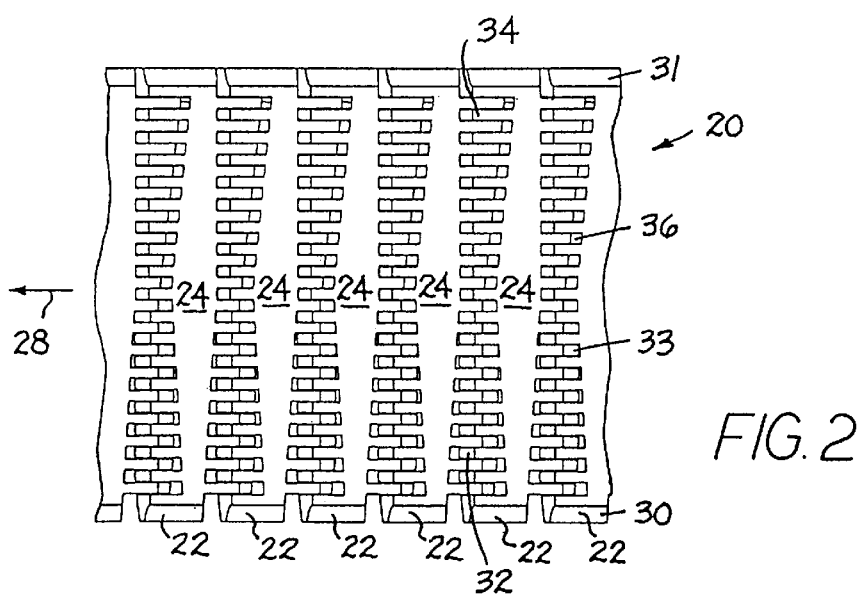
FIG. 2 is a partial plan view of the conveyor belt of FIG. 1 traveling a straight path.

Portions of an exemplary version of a radius belt 20 having features of the invention are shown negotiating a turn in FIG. 1 and following a straight path in FIG. 2. The endless belt is composed of a succession of rows 22 of belt modules 24, preferably injection-molded plastic, connected end to end by pivot rods, or hinge pins 26. Further details of individual modules 24 are shown in FIGS. 3–6. In the version of the belt depicted in the drawings, each row 22 is made up of a single integral module 24. Consequently, the terms "row" and "module" may be used interchangeably in the description of the exemplary version. Although the single-module row is most preferred, versions having side-by-side modules in a row separated by a seam, whether bricklaid or not, are also within the scope of the invention.

Each row of the belt 20 extends transverse to the direction of travel 28 across the width of the belt from a first side edge 30 to a second side edge 31. Each row 22 extends longitudinally in the direction of travel 28 from a first end 32 to a second end 33. A first group 34 of hinge elements, or link ends, spaced across the width of the belt, extends outward from each row along the first end 32. Each of the first group of hinge elements 34 circumscribes a hole 35. The hole is preferably circular in cross-section, but could alternatively be oval, elliptical, triangular, or of another shape. The holes 35 through all the first group of hinge elements 34 are coaxially aligned along a first pivot axis 50 transverse to the direction of belt travel 28. A second group 36 of hinge elements, spaced across the width of the belt, projects outward from each row 22 along the second end 33. Slots 37 are formed in the second group of hinge elements 36. The slots 37, except possibly for those near a central portion of the row, are elongated in the direction of belt travel 28. (Slots near the central portion of the row may be elongated to a lesser degree, even circular.) The slots 37 vary in length across the width of the row, but admit a hinge pin 26 residing along a range of axes, including a transverse axis. The conveyor belt 20 is constructed by interleaving the first group of hinge elements 34 of one row with the second group of hinge elements 36 of an adjacent row and inserting a hinge pin 26 through the passageway formed by the aligned holes 35 and slots 37. The hinge pin 26 can be conventionally retained by snap-lock engagement of the head 27 in belt edge structure, by heading both sides of the pin, or by retaining tabs molded into the belt edge or by retainer clips snapped in place into belt edge structure to retain headless rods. The hinge formed between rows allows the belt to articulate about a drive sprocket or to back-flex upon entering or exiting an inclined path. The slots 37 permit the belt to flex with the belt collapsing at the first side edge 30 in the inside of a turn and fanning out at the second edge 31 at the outside of the turn. The elongated slots are preferably oval or elliptical, but could be of another shape, even circular with a radius large enough to provide a hinge pin free travel in the direction of belt travel.

The second group of hinge elements 36 along each row 22 includes at least a first-side set 38 of hinge elements and a second-side set 39 of hinge elements. The first-side set 38 is disposed along the second end 33 of each row from the first side edge 30 inwardly toward a central portion of the row. The second-side set 39 is disposed inwardly from the second side edge 31 toward the central portion of the row. In the illustrated versions, the central portion is a relatively narrow region at the centerline of each row. In wider belts, the central portion could be a wider region spanning the centerline and encompassing one or more link ends. The distal ends of the slots 37 are bounded by walls forming bearing surfaces that engage the hinge pin 26 and through which belt pull is transmitted as the belt is operated. The distal ends 42 of the first-side set of hinge elements 38 are bounded by bearing surfaces generally aligned along a transverse axis 46. The distal ends 43 of the second-side set of hinge elements 39 are bounded by bearing surfaces generally aligned in a staggered relationship along an oblique axis 47 diverging outward from the transverse axis 46 toward the second side edge 31 of the row 22.

As best shown in the cross-sectional view of FIG. 5, the hinge pin 26, aligned along an oblique axis 57, bears against the distal ends 43 of the second-side set of hinge elements 39 at the outside of a turn as the belt negotiates a curved path. Belt pull is transmitted from the first group of hinge elements 34 of the adjacent row (not shown in FIG. 5) through the hinge pin 26 and to the second-side set by hinge elements 39. The hinge pin 26 does not contact the bearing surfaces at the distal ends 42 of the first-side set of hinge elements 38 at the inside of the turn. Thus, in a turn, belt pull is shared evenly among the second-side set of hinge elements 39. Although the bearing surfaces themselves are preferably aligned along an oblique axis, they could individually be transverse surfaces staggered as a group along an oblique axis. As another alternative, the bearing surfaces could be arranged to define a curved path. When the belt is following a straight path, on the other hand, the hinge pin 26' positions itself along a transverse axis 56. Instead of bearing against the second-side set of hinge elements 39 as it does in a turn, the pin 26' bears against the transverse bearing surfaces at the distal ends 42 of the slots in the first-side set of hinge elements 38. Because the number and thickness of the first-side set of hinge elements 38 are more or less the same as the number and thickness of the second-side set of hinge elements, the pull strength of the belt is roughly the same whether the belt is following a straight or a curved path. By distributing belt pull in this way, the belt does not have to be overdesigned to accommodate turns, and the hinge elements and accompanying belt structure can be dimensioned smaller. The smaller dimensions make for a smoother conveying surface that is less likely to tip products with small bases.

The slots 37 in the second group of hinge elements 36 are sized and arranged, as shown in FIG. 5, to provide a belt with a varying pitch. The pitch at a hinge element is defined as the distance between the axis of the hinge pin bearing against the distal end of the hinge element and the axis of the hinge pin bearing against the corresponding element of an adjacent row as the belt is normally operated in tension. On a straight path, hinge pins 26', 26" are positioned along consecutive transverse axes 50 and 56. The straight-running pitch $P_S$ of the second-side set of hinge elements 38, as determined by the transverse alignment of the distal ends 42 of the circumscribed slots in the second-side set, is constant. In a turn, the pitch $P_T$ is determined by the distal ends 43 of the slots in the second-side set of hinge elements 39, which are aligned along an oblique axis 57 that increasingly diverges from the adjacent axis 50 toward the second side edge 31 of the belt. Thus, the turning pitch $P_T$ increases along the second-side set of hinge elements 39 from the interior to the second side edge 31. In this way, belt pull is shared among the second-side set of hinge elements 39 in a turn and not concentrated at the outside few hinge elements as in conventional radius belts.

To maintain pull strength during the transitions of the belt between straight and curved paths, an interior set 40 of hinge elements is disposed between the first-side set 38 and the second-side set 39. The distal ends 44 of the slots in the interior set of hinge elements 40 are bounded by bearing surfaces that are arranged along a curve that ranges from substantially transverse near the first-side set of hinge elements 38 to oblique near the second-side set 39 so that belt pull is shared among varying portions of the interior, first-side, and second-side sets as the belt transitions between straight and curved paths. In one embodiment the distal ends of the slots of the interior set are arranged tangentially along the curve and there is at least one hinge element in which the angle of the distal end of the slot is greater than the transverse angle and less than the oblique angle of the second-side set of hinge elements.

Other features of the belt decrease its turning ratio to as low as 1.2:1. The proximal ends 52 of at least a portion of the slots in the first-side set of hinge elements 38 closest to the first side edge 30 are aligned along an axis roughly parallel to the oblique axis 47 to provide more room for the hinge pin 26 to retract deeply into the hinge elements at the inside of a tight turn. The distal ends 60 of the first-side set of hinge elements nearest the first side edge 30 are slightly foreshortened to accommodate the collapse of the belt 20 at the inside of a turn.

An individual belt module 24 is shown in FIGS. 4A–4C. The module 24 shown is molded to width so that each side edge 30, 31 can be used to form the sides of a belt constructed of a series of end-to-end-connected modules. The module includes a module body 70 that has a first side portion 72 extending from the first side edge 30 inward toward the center of the module. A second side portion 73 extends inward from the second side edge 31. Each of the first-side set of hinge elements 38 projects outward from a first transverse connecting member 74 along the first side portion 72. Each of the second-side set of hinge elements 39 projects outward from a second transverse connecting member 75 along the second side portion 73. The transverse connecting members maintain the hinge elements generally parallel to one another. The first 74 and second 75 connecting members are parallel and longitudinally offset to allow for greater collapse of the belt at the inside of a turn. The offset connecting members 74, 75 are bridged by an oblique member 76 attached at its ends to the interior ends of the connecting members. A conveying surface 78 is formed on a top side of the module body 70 to provide a smooth product-conveying area. The edge 82 of the conveying surface 78 nearer the first end 32 of the module is preferably tapered in a V shape with its vertex near the center of the module 24 to produce deeper gaps 80 near the first and second side edges 30, 31. The deep gaps near the first side edge 30 accommodate the interleaved hinge elements of the adjacent row as the belt collapses at the inside of a turn. The deep gaps near the second side edge 31 accommodate the interleaved hinge elements as the belt travels a straight path. The distal ends 83 of the second-side set of hinge elements 39 are preferably tapered to conform to the gaps, whose lengths are tapered by the V-shaped edge 82 of the conveying surface 78. For a more open belt, the conveying surface 78 can be conventionally perforated with vents, or the conveying surface can be eliminated, with the top sides of the connecting members 74, 75, 76 and the hinge elements 34, 36 supporting conveyed product.

A belt 20 built using the described modules 24 can be driven from the underside by sprockets 84, as shown in FIG. 6. In a typical conveyor installation, the sprockets are positioned along the underside of the belt on a shaft extending through the sprocket bores 92. The shaft is, in turn, coupled to a motor that rotates the shaft and the sprockets to drive the belt. The belt, sprockets, shaft, and motor are suported in a conveyor frame. A driving surface 86 on a raised portion or tooth on the periphery of the sprocket 84 engages an undercut drive surface 88 along the underside of the first-side set of hinge elements 38 as the sprocket rotates in a direction 90. As shown in FIG. 3B, undercut drive surfaces 89 provided in the underside of hinge elements of the first group on the first side of the module are engaged by the sprocket to drive the belt in the opposite direction. Thus, the belt is capable of bidirectional operation. Alternatively, the belt could be driven by a second driving surface 87 that engages one of the transverse connecting members 74, 75. If the connecting members are so used as drive bars, they would preferably be contoured to mate with the contours of the driving surface 87 to minimize the scrubbing of the sprocket and belt drive surfaces they engage. The belt could also be edge-driven along the first side edge by a spiral drive capstan, for instance.

Although the invention has been described in detail with reference to a preferred version, other versions are possible. For example, the hinge pins depicted in the drawings are shown as individual rods continuous across the width of a belt row and free to rotate relative to both hinge elements. The hinge pins could alternatively be segmented across the width of the row or held captive by press-fitting, for example, in the holes through the first group of hinge elements. In yet another version of the invention, the hinge pins could be formed by integrally molded stubs extending transversely from the sides of the first group of hinge elements into the slots of the second group of interleaved hinge elements of an adjacent row. In such a version, the first group of hinge elements would not have to form holes for hinge pins. Therefore, the spirit and scope of the claims should not be limited to the description of the preferred version.

What is claimed is:

1. A modular conveyor belt suitable for following a straight and a curved path, comprising a series of rows of belt modules extending laterally from a first side edge to a second side edge and hingedly interlinked end-to-end into an endless conveyor belt by hinge pins journalled in lateral passageways through interleaved first and second groups of hinge elements at respective first and second ends of consecutive rows, wherein the passageways are formed at least partly by slots through the second group of interleaved hinge elements between each row and wherein the slots are bounded by bearing surfaces at the distal ends of the second group of hinge elements and the bearing surfaces are arranged relative to each other so that the pitch of each row between the second side edge and a generally central portion of the row decreases with distance from the second side edge, the pitch between the generally central portion and the first side edge is substantially constant, and the pitch in the generally central portion of the row varies, decreasing with distance from the second side edge, the rate of decrease continuously slowing until the pitch becomes substantially constant in order to provide a smooth transition in pitch as the belt transitions between a curved path and a straight path.

2. A modular conveyor belt as in claim 1 wherein the passageways are further formed by holes through the first group of hinge elements aligned with the slots through the second group of interleaved hinge elements between each row.

3. A modular conveyor belt as in claim 1 wherein each row comprises a single belt module.

4. A modular conveyor belt as in claim 1 wherein the number of hinge elements of the second group between the first side edge and the central portion is equal to the number of hinge elements of the second group between the second side edge and the central portion.

5. A modular conveyor belt as in claim 1 wherein all the hinge elements of the second group are of the same thickness.

6. A modular conveyor belt as in claim 1 wherein the slots in each of the second group of hinge elements between the second side edge and the central portion are tapered in length across the width of the element.

7. A modular conveyor belt as in claim 1 wherein the distal ends of the slots in the second group of hinge elements between the first side edge and the central portion are aligned with one another along an axis perpendicular to the direction of belt travel.

8. A modular conveyor belt as in claim 1 wherein the distal ends of the slots in the second group of hinge elements between the second side edge and the central portion are aligned along an axis oblique to the direction of belt travel.

9. A modular conveyor belt suitable for conveying product in a direction of travel that may include a straight and a curved path, comprising:

a succession of rows of belt modules, each row extending in the direction of travel from a first end to a second end and extending across the width of the belt from a first side edge to a second side edge, each row including a first group of hinge elements at the first end of the row and a second group of hinge elements at the second end of the row, the first group of hinge elements circumscribing holes aligned coaxially along a first hinge axis, the second group of hinge elements circumscribing aligned slots, the first group of hinge elements of a row being interleaved with the second group of hinge elements of an adjacent row; and a plurality of hinge pins extending through the aligned holes and slots of interleaved hinge elements to hingedly link consecutive rows of belt modules into an endless conveyor belt;

wherein the second group of hinge elements includes a first-side plurality of hinge elements disposed inwardly from the first side edge of the row to a generally central portion of the row and a second-side plurality of hinge elements disposed inwardly from the second side edge of the row to the generally central portion of the row, wherein the first-side plurality and the second-side plurality have substantially the same number of hinge elements, each of the slots in the first-side plurality and the second-side plurality of hinge elements being bounded by a bearing surface at the distal end of the slot, the bearing surfaces of the first-side plurality of hinge elements being aligned along a first-side bearing axis parallel to the first hinge axis, the bearing surfaces of the second-side plurality of hinge elements being aligned along a second-side bearing axis oblique to the first-side bearing axis, the hinge pin bearing against the bearing surfaces of the first-side hinge elements along the first-side bearing axis as the conveyor belt follows a straight path and against the bearing surfaces of the second-side hinge elements along the oblique second-side bearing axis as the conveyor belt follows a curved path, whereby belt load is borne by substantially the same number of hinge elements on straight and on curved paths.

10. A modular conveyor belt as in claim 9 wherein the length of the second-side plurality of hinge elements decreases with distance from the second side edge.

11. A modular conveyor belt as in claim 9 wherein the second group of hinge elements further includes an interior plurality of hinge elements disposed between the first-side plurality and the second-side plurality, the bearing surfaces of the interior plurality of hinge elements being arranged along a curve generally aligned with the first-side bearing axis near the first-side plurality of hinge elements and generally aligned with the second-side bearing axis near the second-side plurality of hinge elements, the hinge pin bearing against the bearing surfaces of at least a portion of the interior hinge elements as the conveyor belt transitions between straight and curved paths.

12. A modular conveyor belt as in claim 9 wherein the distal ends of the second-side plurality of hinge elements are spaced farther from the first hinge axis than are the distal ends of the first-side plurality of hinge elements.

13. A modular conveyor belt as in claim 9 wherein all the hinge elements of the second group have the same thickness.

14. A modular conveyor belt as in claim 9 wherein the distal ends of the second-side plurality of hinge elements are collinearly aligned parallel to the oblique second-side bearing axis.

15. A modular conveyor belt suitable for conveying product in a direction of travel that may include a straight or a curved path, comprising:

a succession of rows of belt modules, each row extending in the direction of travel from a first end to a second end and extending in the transverse direction across the width of the belt from a first side edge to a second side edge, each row including a first group of hinge elements spaced apart transversely along the first end of the row and a second group of hinge elements spaced apart transversely along the second end of the row;

the first group of hinge elements circumscribing a group of transversely aligned holes;

the second group of hinge elements including a first set of hinge elements, a second set of hinge elements, and an interior set of hinge elements disposed between the first set and the second set, the second group of hinge elements circumscribing a group of aligned slots elongated in the direction of travel, wherein the first set of hinge elements each comprise a transverse bearing surface defining the distal end of the slot, the second set of hinge elements each comprise an oblique bearing surface defining the distal end of the slot, and the hinge elements of the interior set each comprise a bearing surface defining the distal end of the slot, the bearing surfaces of the interior set arranged tangentially along a continuous curve that ranges from an angle transverse to the direction of travel near the first set of hinge elements to an oblique angle equal to the angle of said oblique bearing surface near the second set of hinge elements, and wherein said bearing surface of at least one hinge element of the interior set has an angle greater than said transverse angle and less than said oblique angle;

the first group of hinge elements of a row being interleaved with the second group of hinge elements of an adjacent row; and a plurality of hinge pins extending through the aligned holes and slots of interleaved hinge elements to hingedly link consecutive rows of belt modules to form an endless conveyor belt capable of articulating about a sprocket and of following a straight or a curved path.

16. A belt module for use in constructing an endless conveyor belt suitable for travel along a straight or a curved path, comprising:

a module body extending longitudinally from a first end to a second end and transversely from a first side edge to a second side edge and including a first side portion disposed inwardly from the first side edge to a central portion and a second side portion disposed inwardly from the second side edge to the central portion;

a first group of hinge elements spaced apart along the first end of the module body, each hinge element circumscribing a transverse hole aligned coaxially with the transverse holes of the other of the first group of hinge elements; and a second group of hinge elements spaced apart along the second end of the module body, each of the second group of hinge elements circumscribing a slot terminated at its distal end in a wall, the second group of hinge elements including a first set of hinge elements, a second set of hinge elements, and an interior set of hinge elements disposed between the first set and the second set, wherein the walls of the first set of hinge elements are arranged along a transverse axis, the walls of the second set of hinge elements are arranged along an oblique axis, and the walls of the interior set of hinge elements are arranged along a curve smoothly connecting the oblique axis to the transverse axis, wherein said curve at the wall of at least one hinge element of the interior set is at an angle greater than said transverse axis and less than said oblique axis.

17. A belt module as in claim 16 wherein the transverse holes in the first group of hinge elements are substantially circular in cross-section.

18. A belt module as in claim 16 wherein the hinge elements of the second group have the same thickness.

19. A belt module as in claim 16 wherein the distal ends of the second-side set of hinge elements are spaced apart farther from the distal ends of the first group of hinge elements than are the distal ends of the first-side set of hinge elements.

20. A belt module as in claim 16 wherein the slot in each of the second set of hinge elements is bounded at the distal end by an oblique wall.

21. A belt module as in claim 16 wherein the first side portion includes a first transverse connecting member for maintaining the hinge elements of the first side portion generally parallel and wherein the second side portion includes a second transverse connecting member for maintaining the hinge elements of the second-side portion generally parallel and wherein the transverse connecting members are offset longitudinally.

22. A belt module as in claim 21 wherein the module body further comprises an oblique member connected between the first transverse connecting member and the second transverse connecting member near the central portion of the belt module.

23. A belt module as in claim 16 wherein the first set of hinge elements includes undercut drive surfaces for engaging the driving surfaces of a drive sprocket.

24. A belt module as in claim 16 further comprising a conveying surface forming a top surface on the module body, the conveying surface forming a V-shaped edge along the first group of hinge elements.

25. A modular conveyor belt suitable for conveying product in a direction of travel that may include a straight or a curved path, comprising:

a succession of rows of belt modules, each row extending in the direction of travel from a first end to a second end and extending in the transverse direction across the width of the belt from a first side edge to a second side edge, each row including a first group of hinge elements spaced apart transversely along the first end of the row and a second group of hinge elements spaced apart transversely along the second end of the row;

the first group of hinge elements circumscribing a group of transversely aligned holes;

the second group of hinge elements including a first set of hinge elements, a second set of hinge elements, and an interior set of hinge elements disposed between the first set and the second set, the second group of hinge elements circumscribing a group of aligned slots elongated in the direction of travel and wherein the distal ends of the slots in the first set of hinge elements are transversely aligned and wherein the distal ends of the slots in the second set of hinge elements are aligned along an axis oblique to the transverse direction and wherein the distal ends of the slots in the interior set of hinge elements tangentially follow a continuous curve ranging from an angle transverse to the direction of travel near the first set of hinge elements to an oblique angle substantially equal to an angle of said oblique axis near the second set, and wherein at least one of said distal ends of the slots in the interior set of hinge elements has an angle greater than said transverse angle and less than said oblique angle;

the first group of hinge elements of a row being interleaved with the second group of hinge elements of an adjacent row; and a plurality of hinge pins extending through the aligned holes and slots of interleaved hinge elements to hingedly link consecutive rows of belt modules to form an endless conveyor belt capable of articulating about a sprocket and of following a straight or a curved path.

26. A modular conveyor belt as in claim 25 further comprising a conveying surface forming a top surface on each row, the conveying surface forming a V-shaped edge having a vertex disposed near the center of the row.

27. A modular conveyor belt as in claim 25 wherein the first group of hinge elements are spaced apart to form gaps between consecutive hinge elements of a row, the gaps being deeper in the direction of travel near the first and second side edges than near the center of the row.

28. A modular conveyor belt suitable for conveying product in a direction of travel that may include a straight or a curved path, comprising:

a succession of rows of belt modules, each row extending in the direction of travel from a first end to a second end and extending in the transverse direction across the width of the belt from a first side edge to a second side edge, each row including a first group of hinge elements spaced apart transversely along the first end of the row and a second group of hinge elements spaced apart transversely along the second end of the row;

the first group of hinge elements circumscribing a group of transversely aligned holes;

the second group of hinge elements including a first set of hinge elements, a second set of hinge elements, and an interior set of hinge elements disposed between the first set and the second set, the second group of hinge elements circumscribing a group of aligned slots elongated in the direction of travel and wherein the spacing between the first end of a row and the distal ends of the slots of the second set of hinge elements at the second end of the row decreases with distance inwardly from a side edge of the row and wherein the spacing between the first end of a row and the proximal ends of the slots of the first set of hinge elements at the second end of the row increases with distance inwardly from an opposite side edge of the row and wherein the spacing between the first end of the row and the distal ends of the slots in the interior set of hinge elements follows a curve that is continuous with the distal ends of the slots in the second set of hinge elements and transitions to substantially constant near the first set of hinge elements;

the first group of hinge elements of a row being interleaved with the second group of hinge elements of an adjacent row; and a plurality of hinge pins extending through the aligned holes and slots of interleaved hinge elements to hingedly link consecutive rows of belt modules to form an endless conveyor belt capable of articulating about a sprocket and of following a straight or a curved path.

29. A modular conveyor belt as in claim 28 further comprising a conveying surface forming a top surface on each row, the conveying surface forming a V-shaped edge having a vertex disposed near the center of the row.

30. A modular conveyor belt as in claim 28 wherein the first group of hinge elements are spaced apart to form gaps between consecutive hinge elements of a row, the gaps being deeper in the direction of travel near the first and second side edges than near the center of the row.

31. A modular conveyor belt suitable for conveying product in a direction of travel that may include a straight or a curved path, comprising:

a succession of rows of belt modules, each row extending in the direction of travel from a first end to a second end and extending in the transverse direction across the width of the belt from a first side edge to a second side edge, each row including a first group of hinge elements spaced apart transversely along the first end of the row and a second group of hinge elements spaced apart transversely along the second end of the row;

the first group of hinge elements circumscribing a group of transversely aligned holes;

the second group of hinge elements including a first-side set of hinge elements disposed inwardly from the first side edge of the row and a second-side set of hinge elements disposed inwardly from the second side edge of the row, wherein the first-side set and the second-side set have about the same number of hinge elements, the second group of hinge elements circumscribing a group of aligned slots elongated in the direction of travel and wherein the opposite ends of the slots in the second-side set of hinge elements converge toward each other from hinge element to hinge element with distance inwardly from the second side edge and wherein the distal ends of the slots in the first-side set of hinge elements are aligned along an axis transverse to the direction of belt travel, such that a belt load is borne by substantially a same number of hinge elements on straight and curved paths;

the first group of hinge elements of a row being interleaved with the second group of hinge elements of an adjacent row; and a plurality of hinge pins extending through the aligned holes and slots of interleaved hinge elements to hingedly link consecutive rows of belt modules to form an endless conveyor belt capable of articulating about a sprocket and of following a straight or a curved path.

32. A modular conveyor belt as in claim 31 wherein the hinge elements of the first-side set and of the second-side set are all of the same thickness.

* * * * *